(12) United States Patent
Evers et al.

(10) Patent No.: US 12,182,638 B2
(45) Date of Patent: Dec. 31, 2024

(54) METHOD AND SYSTEM FOR EVENT TOPIC CHECKPOINTING

(71) Applicant: JPMorgan Chase Bank, N.A., New York, NY (US)

(72) Inventors: Maxwell Evers, Wilmington, DE (US); Prakash Ravi, Bear, DE (US); Amit Kumar Meshram, Romansville, PA (US); Indrajit Biswas, Newark, DE (US); Pravallika Santhil, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 310 days.

(21) Appl. No.: 17/903,623

(22) Filed: Sep. 6, 2022

(65) Prior Publication Data

US 2024/0078141 A1    Mar. 7, 2024

(51) Int. Cl.
*G06F 9/54* (2006.01)
*G06F 9/50* (2006.01)

(52) U.S. Cl.
CPC ............ *G06F 9/542* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 2015/0058657 A1* | 2/2015 | Archer | G06F 1/324 713/600 |
| 2016/0092251 A1* | 3/2016 | Wagner | G06F 9/5077 718/1 |

\* cited by examiner

*Primary Examiner* — Craig C Dorais
(74) *Attorney, Agent, or Firm* — GREENBLUM & BERNSTEIN, P.L.C.

(57) ABSTRACT

A method for providing ingestion checkpointing from an event topic is disclosed. The method includes polling, via an event consumer, a message broker to initiate consumption of events from the event topic, the event topic relating to event storage; checkpointing, based on a result of the polling, the consumption of the events by writing corresponding data in multiple stages to a checkpointing durable store; inserting an event pending status for each of the events in an events time bucket table; committing, via the event consumer, the consumption of the events; initiating event processing for the events; and updating the events time bucket table with an event complete status when consumption of the events are completed.

20 Claims, 7 Drawing Sheets

METHOD AND SYSTEM FOR EVENT TOPIC CHECKPOINTING

BACKGROUND

1. Field of the Disclosure

This technology generally relates to methods and systems for data ingestion checkpointing, and more particularly to methods and systems for providing event consumption checkpointing via a durable storage repository to facilitate accurate and resilient ingestion of events from event topics.

2. Background Information

Many business entities implement distributed event storage and stream processing platforms to manage complex application data streams in real-time via a plurality of data feeds. Often, large quantities of data such as, for example, events, messages, and records are ingested in real-time from event topics via the plurality of data feeds. Historically, implementations of conventional event ingestion management techniques have resulted in varying degrees of success with respect to event ingestion resiliency and accuracy.

One drawback of using the conventional event ingestion management techniques is that in many instances, various events may be lost during high volume ingestion from event topics. As a result, ingested events may not be fully processed in a resilient fashion. Additionally, even when unconsumed events are identified, corrective actions may require re-ingesting the complete volume of events.

Therefore, there is a need to provide event consumption checkpointing via a durable storage repository to facilitate accurate and resilient ingestion of events from event topics.

SUMMARY

The present disclosure, through one or more of its various aspects, embodiments, and/or specific features or sub-components, provides, inter alia, various systems, servers, devices, methods, media, programs, and platforms for providing event consumption checkpointing via a durable storage repository to facilitate accurate and resilient ingestion of events from event topics.

According to an aspect of the present disclosure, a method for providing ingestion checkpointing from an event topic is disclosed. The method is implemented by at least one processor. The method may include polling, via an event consumer, a message broker to initiate consumption of at least one event from the event topic, the event topic may relate to event storage; checkpointing, based on a result of the polling, the consumption of the at least one event by writing corresponding data in multiple stages to a checkpointing durable store; inserting an event pending status for the at least one event in an events time bucket table; committing, via the event consumer, the consumption of the at least one event; initiating event processing for the at least one event; and updating the events time bucket table with an event complete status when consumption of the at least one event is completed.

In accordance with an exemplary embodiment, the method may further include asynchronously evaluating, during the event processing, the checkpointing durable store to identify at least one unconsumed event that has not been fully consumed; and automatically reintroducing the identified at least one unconsumed event into the event processing.

In accordance with an exemplary embodiment, to asynchronously evaluate the checkpointing durable store, the method may further include identifying the events time bucket table that corresponds to the event processing by using a high watermark table; and discovering at least one pending event in the identified events time bucket table, wherein the at least one pending event may be associated with the event pending status.

In accordance with an exemplary embodiment, to automatically reintroduce the identified at least one unconsumed event, the method may further include determining at least one injection point for the at least one unconsumed event; and reintroducing, into the event processing, the at least one unconsumed event at the determined at least one injection point.

In accordance with an exemplary embodiment, the determined at least one injection point may correspond to at least one stage in the event processing, the at least one stage may relate to an optimal position in the event processing to reintroduce the at least one unconsumed event.

In accordance with an exemplary embodiment, the events time bucket table may be updated with the event complete status when consumption of the at least one unconsumed event is completed.

In accordance with an exemplary embodiment, the event topic may relate to an ordered log of a plurality of events that stores and publishes at least one record for a plurality of producers and a plurality of subscribers in a distributed event store and stream-processing environment.

In accordance with an exemplary embodiment, the corresponding data may be written sequentially to the checkpointing durable store in multiple stages, each of the multiple stages may relate to a portion of the corresponding data that is segmented based on load balancing.

In accordance with an exemplary embodiment, the method may further include deserializing the at least one event prior to the checkpointing, wherein the deserializing may relate to conversion of a stream of bytes that correspond to the at least one event into a readable and interpretable data object.

According to an aspect of the present disclosure, a computing device configured to implement an execution of a method for providing ingestion checkpointing from an event topic is disclosed. The computing device including a processor; a memory; and a communication interface coupled to each of the processor and the memory, wherein the processor may be configured to poll, via an event consumer, a message broker to initiate consumption of at least one event from the event topic, the event topic may relate to event storage; checkpoint, based on a result of the polling, the consumption of the at least one event by writing corresponding data in multiple stages to a checkpointing durable store; insert an event pending status for the at least one event in an events time bucket table; commit, via the event consumer, the consumption of the at least one event; initiate event processing for the at least one event; and update the events time bucket table with an event complete status when consumption of the at least one event is completed.

In accordance with an exemplary embodiment, the processor may be further configured to asynchronously evaluate, during the event processing, the checkpointing durable store to identify at least one unconsumed event that has not been fully consumed; and automatically reintroduce the identified at least one unconsumed event into the event processing.

In accordance with an exemplary embodiment, to asynchronously evaluate the checkpointing durable store, the processor may be further configured to identify the events time bucket table that corresponds to the event processing by using a high watermark table; and discover at least one pending event in the identified events time bucket table, wherein the at least one pending event may be associated with the event pending status.

In accordance with an exemplary embodiment, to automatically reintroduce the identified at least one unconsumed event, the processor may be further configured to determine at least one injection point for the at least one unconsumed event; and reintroduce, into the event processing, the at least one unconsumed event at the determined at least one injection point.

In accordance with an exemplary embodiment, the determined at least one injection point may correspond to at least one stage in the event processing, the at least one stage may relate to an optimal position in the event processing to reintroduce the at least one unconsumed event.

In accordance with an exemplary embodiment, the processor may be further configured to update the events time bucket table with the event complete status when consumption of the at least one unconsumed event is completed.

In accordance with an exemplary embodiment, the event topic may relate to an ordered log of a plurality of events that stores and publishes at least one record for a plurality of producers and a plurality of subscribers in a distributed event store and stream-processing environment.

In accordance with an exemplary embodiment, the processor may be further configured to write the corresponding data sequentially to the checkpointing durable store in multiple stages, each of the multiple stages may relate to a portion of the corresponding data that is segmented based on load balancing.

In accordance with an exemplary embodiment, the processor may be further configured to deserialize the at least one event prior to the checkpointing, wherein the deserializing may relate to conversion of a stream of bytes that correspond to the at least one event into a readable and interpretable data object.

According to an aspect of the present disclosure, a non-transitory computer readable storage medium storing instructions for providing ingestion checkpointing from an event topic is disclosed. The storage medium including executable code which, when executed by a processor, may cause the processor to poll, via an event consumer, a message broker to initiate consumption of at least one event from the event topic, the event topic may relate to event storage; checkpoint, based on a result of the polling, the consumption of the at least one event by writing corresponding data in multiple stages to a checkpointing durable store; insert an event pending status for the at least one event in an events time bucket table; commit, via the event consumer, the consumption of the at least one event; initiate event processing for the at least one event; and update the events time bucket table with an event complete status when consumption of the at least one event is completed.

In accordance with an exemplary embodiment, when executed by the processor, the executable code may further cause the processor to asynchronously evaluate, during the event processing, the checkpointing durable store to identify at least one unconsumed event that has not been fully consumed; and automatically reintroduce the identified at least one unconsumed event into the event processing.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
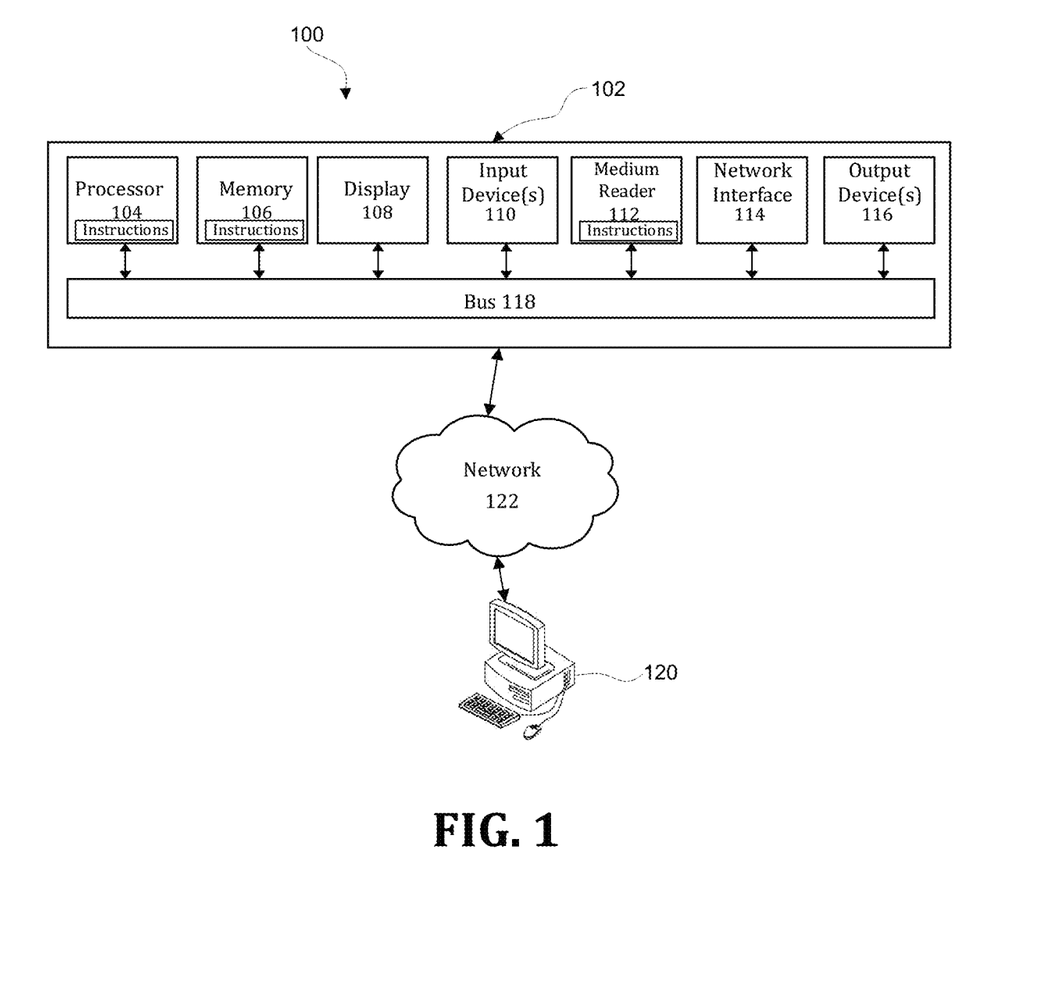
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing event consumption checkpointing via a durable storage repository to facilitate accurate and resilient ingestion of events from event topics.

Figure 2:
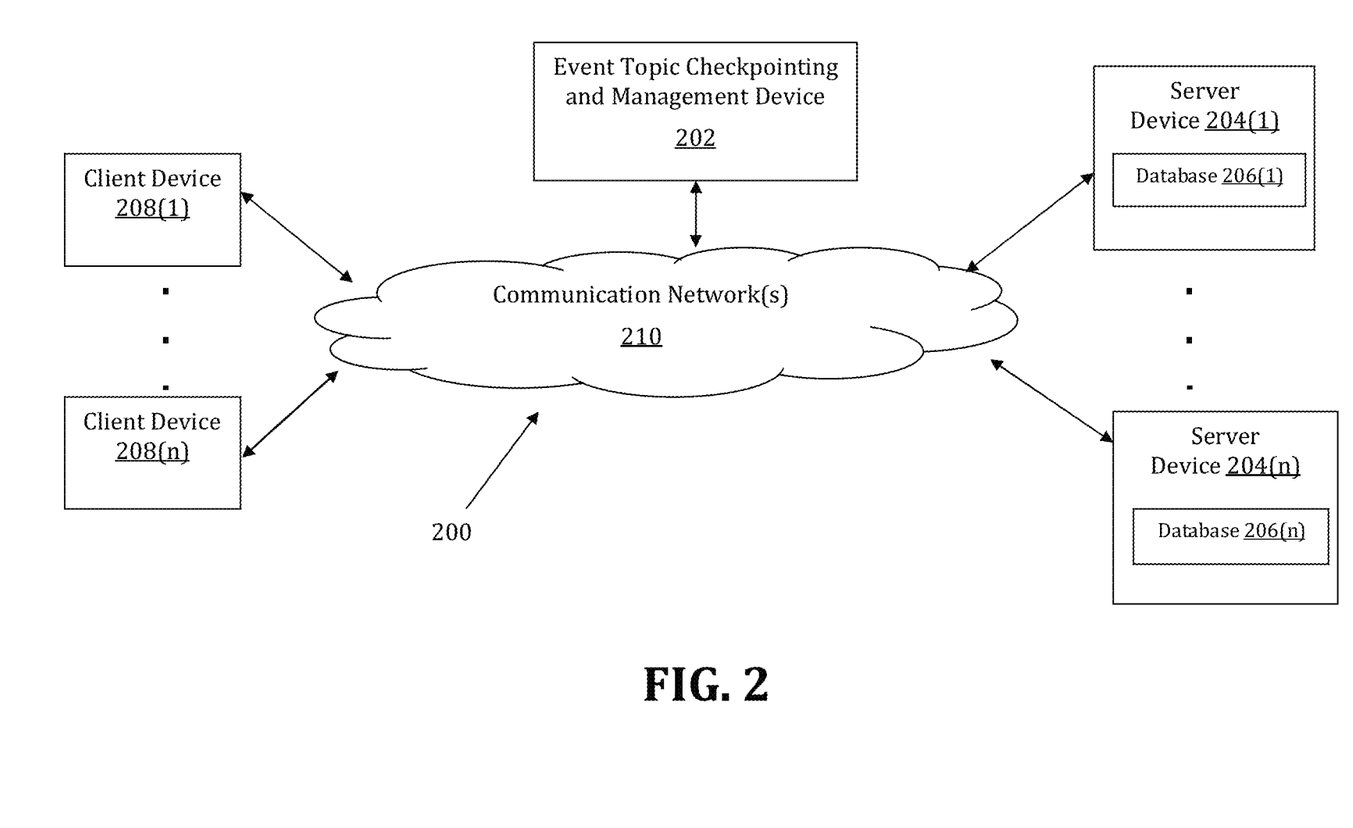
FIG. 2 illustrates an exemplary diagram of a network environment.

Referring to FIG. 2, a schematic of an exemplary network environment 200 for implementing a method for providing event consumption checkpointing via a durable storage repository to facilitate accurate and resilient ingestion of events from event topics is illustrated. In an exemplary embodiment, the method is executable on any networked computer platform, such as, for example, a personal computer (PC).

The method for providing event consumption checkpointing via a durable storage repository to facilitate accurate and resilient ingestion of events from event topics may be implemented by an Event Topic Checkpointing and Management (ETCM) device 202. The ETCM device 202 may be the same or similar to the computer system 102 as described with respect to FIG. 1. The ETCM device 202 may store one or more applications that can include executable instructions that, when executed by the ETCM device 202, cause the ETCM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ETCM device 202 itself, may be located in virtual server(s) running in a cloud-based computing environment rather than being tied to one or more specific physical network computing devices. Also, the application(s) may be running in one or more virtual machines (VMs) executing on the ETCM device 202. Additionally, in one or more embodiments of this technology, virtual machine(s) running on the ETCM device 202 may be managed or supervised by a hypervisor.

In the network environment 200 of FIG. 2, the ETCM device 202 is coupled to a plurality of server devices 204(1)-204(n) that hosts a plurality of databases 206(1)-206(n), and also to a plurality of client devices 208(1)-208(n) via communication network(s) 210. A communication interface of the ETCM device 202, such as the network interface 114 of the computer system 102 of FIG. 1, operatively couples and communicates between the ETCM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ETCM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ETCM devices that efficiently implement a method for providing event consumption checkpointing via a durable storage repository to facilitate accurate and resilient ingestion of events from event topics.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ETCM device 202 may be a standalone device or integrated with one or more other devices or apparatuses, such as one or more of the server devices 204(1)-204(n), for example. In one particular example, the ETCM device 202 may include or be hosted by one of the server devices 204(1)-204(n), and other arrangements are also possible. Moreover, one or more of the devices of the ETCM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ETCM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to events, messages, records, event topics, event data event pending statuses, event complete statuses, unconsumed events, pending events, events time bucket tables, high watermark tables, and injection points.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ETCM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ETCM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ETCM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ETCM device 202, the server devices 204(1)-204(n), or the client devices 208(1)-208(n), for example, may be configured to operate as virtual instances on the same physical machine. In other words, one or more of the ETCM device 202, the server devices 204(1)-204(n), or the client devices 208(1)-208(n) may operate on the same physical device rather than as separate devices communicating through communication network(s) 210. Additionally, there may be more or fewer ETCM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
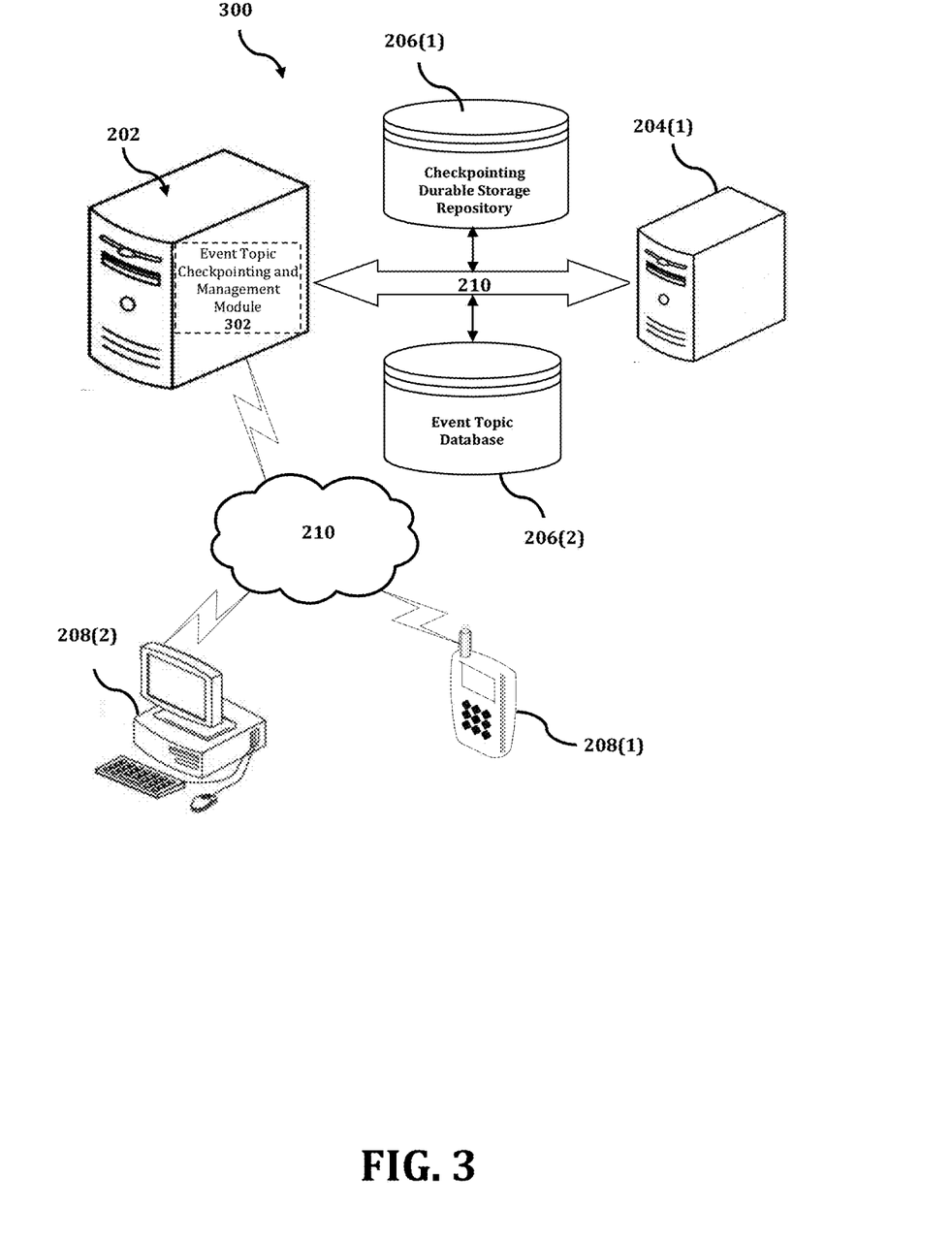
FIG. 3 shows an exemplary system for implementing a method for providing event consumption checkpointing via a durable storage repository to facilitate accurate and resilient ingestion of events from event topics.

The ETCM device 202 is described and shown in FIG. 3 as including an event topic checkpointing and management module 302, although it may include other rules, policies, modules, databases, or applications, for example. As will be described below, the event topic checkpointing and management module 302 is configured to implement a method for providing event consumption checkpointing via a durable storage repository to facilitate accurate and resilient ingestion of events from event topics.

An exemplary process 300 for implementing a mechanism for providing event consumption checkpointing via a durable storage repository to facilitate accurate and resilient ingestion of events from event topics by utilizing the network environment of FIG. 2 is shown as being executed in FIG. 3. Specifically, a first client device 208(1) and a second client device 208(2) are illustrated as being in communication with ETCM device 202. In this regard, the first client device 208(1) and the second client device 208(2) may be "clients" of the ETCM device 202 and are described herein as such. Nevertheless, it is to be known and understood that the first client device 208(1) and/or the second client device 208(2) need not necessarily be "clients" of the ETCM device 202, or any entity described in association therewith herein. Any additional or alternative relationship may exist between either or both of the first client device 208(1) and the second client device 208(2) and the ETCM device 202, or no relationship may exist.

Further, ETCM device 202 is illustrated as being able to access a checkpointing durable storage repository 206(1) and an event topic database 206(2). The event topic checkpointing and management module 302 may be configured to access these databases for implementing a method for providing event consumption checkpointing via a durable storage repository to facilitate accurate and resilient ingestion of events from event topics.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ETCM device 202 via broadband or cellular communication. Of course, these embodiments are merely exemplary and are not limiting or exhaustive.

Upon being started, the event topic checkpointing and management module 302 executes a process for providing event consumption checkpointing via a durable storage repository to facilitate accurate and resilient ingestion of events from event topics. An exemplary process for providing event consumption checkpointing via a durable storage repository to facilitate accurate and resilient ingestion of events from event topics is generally indicated at flowchart 400 in FIG. 4.

Figure 4:
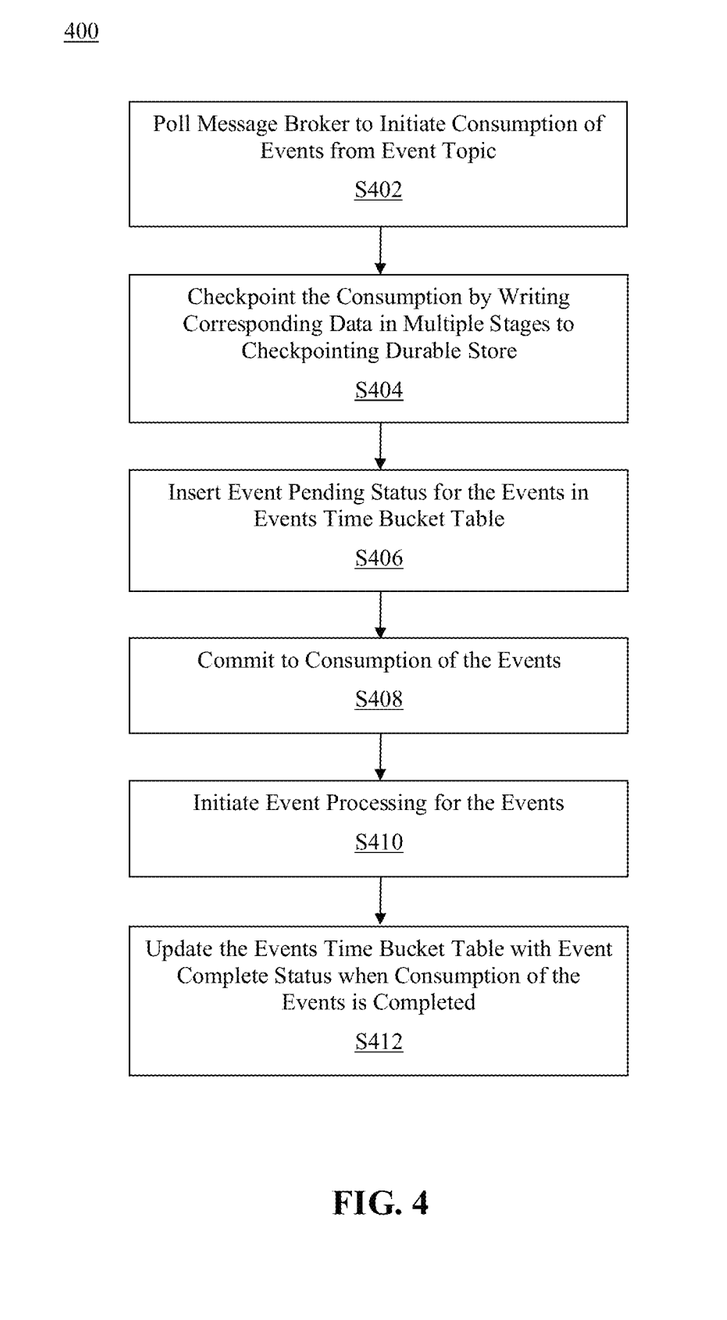
FIG. 4 is a flowchart of an exemplary process for implementing a method for providing event consumption checkpointing via a durable storage repository to facilitate accurate and resilient ingestion of events from event topics.

In the process 400 of FIG. 4, at step S402, a message broker may be polled to initiate consumption of events such as, for example, records and messages from an event topic. The message broker may be polled via an event consumer. In an exemplary embodiment, the message broker may correspond to a distributed event store and stream-processing platform such as, for example a KAFKA platform. The message broker may connect to internal as well as external systems to provide stream libraries for stream processing applications. In another exemplary embodiment, the message broker may utilize a commit log to allow users to subscribe and publish data to any number of systems and/or real-time applications.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, polling may correspond to a function that the event consumer calls to retrieve records from a given event topic. When polling the message broker, the event consumer may provide relevant parameters for consumption of the events. The parameters may include a timeout argument that outlines the maximum amount of time to wait for records to process before returning. In another exemplary embodiment, for each poll, the event consumer may try to use the last consumed offset as the starting offset and fetch sequentially. The last consumed offset may be manually set as well as automatically set as the last committed offset for the subscribed list of partitions.

In another exemplary embodiment, the event topic may relate to a repository of a plurality of events. The event topic may relate to an ordered log of events that stores and published corresponding records for a plurality of producers and a plurality of subscribers in a distributed event store and stream-processing environment. In another exemplary embodiment, the event topic may correspond to a category and/or feed name to which records are stored and published. Producer applications may write data to the event topic and consumer applications may read from the topics. Records that are published to the event topic may stay in the cluster until a configurable retention period has passed.

In another exemplary embodiment, the records may be retained in the log. As such, the event consumer is responsible for tracking the position, i.e., the offset of the records in the log. The event consumer may advance the offset in a linear manner as messages are read. Further, the position of the messages may also be controlled by the event consumer, which consumes the messages in any order. For example, the event consumer may reset to an older offset when reprocessing records.

In another exemplary embodiment, the event topic may be divided into a number of partitions, which include records in an unchangeable sequence. Each record in a partition may be assigned and identified by a unique offset. The event topic may also include multiple partition logs, which allows multiple consumers to read from the event topic in parallel. The partitions may allow the event topics to be parallelized by splitting the data into a particular event topic across multiple message brokers.

At step S404, the consumption of the events may be checkpointed by writing corresponding data in multiple stages to a checkpointing durable store. In an exemplary embodiment, the events may be written to the checkpointing durable store prior to returning offset commits to the message broker. The consumption may be checkpointed based on a result of the polling. Over the lifecycle of ingesting the events, multiple stages may be written to the checkpointing durable store, which may be marked as fully consumed at the end of the consumption of the events.

In another exemplary embodiment, the corresponding data may be written sequentially to the checkpointing durable store in multiple stages. Each of the multiple stages may relate to a portion of the corresponding data that is segmented based on load balancing. In another exemplary embodiment, the load balancing for each of the multiple stages may be based on an operating guideline such as, for example, a guideline to maximize operating efficiency as well as a business guideline such as, for example, a guideline to minimize operating costs. For instance, the stages may be segmented into particular file sizes to facilitate enhanced processing speeds.

In another exemplary embodiment, the events may be deserialized prior to the checkpointing. The deserializing may relate to conversion of a stream of bytes that correspond to the events into a readable and interpretable data object. In another exemplary embodiment, the deserializing may be performed by an interface that converts the stream of bytes into the data objects. A class that implements the deserializing interface may be expected to have a constructor with no parameters.

At step S406, an event pending status may be inserted for each of the events in an events time bucket table. In an exemplary embodiment, the events time bucket table may correspond to a data repository such as, for example, a distributed database that stores relevant event information such as, for example, a processing status. The distributed database may relate to a non-relation structured query language (NoSQL) database that is designed to handle large amounts of data across many commodity servers.

At step S408, the consumption of the events may be committed via the event consumer. In an exemplary embodiment, the commit may correspond to an indication from the event consumer to the message broker that consumption parameters are affixed. The commit may confirm for the message broker the data consumption parameters provided by the event consumer. A record of the commits may be stored in a commit log.

At step S410, event processing for the events may be initiated. In an exemplary embodiment, the event processing may relate to implementation of various functionalities to facilitate consumption of the events. The event processing may implement stream processors that perform functions necessary to ingest the events from the event topic. The stream processor may include stream processing applications that makes use of stream libraries. The stream processing applications may define computational logic through one or more processor topologies, where a processor topology is a graph of stream processors, i.e., nodes that are connected by streams, i.e., edges.

At step S412, the events time bucket table may be updated with an event complete status when consumption of the events is completed. Consistent with present disclosures, the events time bucket table may correspond to a data repository such as, for example, a distributed database that stores relevant event information such as, for example, a processing status. The distributed database may relate to a non-relation structured query language (NoSQL) database that is designed to handle large amounts of data across many commodity servers.

In another exemplary embodiment, the checkpointing durable store may be asynchronously evaluated to identify unconsumed events that have not been fully consumed. The checkpointing durable store may be asynchronously evaluated during the event processing as well as at the conclusion of the ingestion.

In another exemplary embodiment, to asynchronously evaluate the checkpointing durable store, the events time bucket table that corresponds to the event processing may be identified by using a high watermark table. The high watermark table may correspond to a data table that includes data relating to a corresponding high watermark offset. The high watermark offset may include the offset of the latest message in the event topic available for consumption. Then, pending events, which have not yet been consumed, may be discovered in the identified events time bucket table. The pending events may be associated with an event pending status.

After the pending events have been discovered, the identified unconsumed events may be automatically reintroduced into the event processing stream. In another exemplary embodiment, to automatically reintroduce the identified unconsumed events, injection points may be determined for each of the unconsumed events. The determined injection points may correspond to a stage in the event processing stream where the unconsumed events may be reintroduced for processing.

The stage may relate to an optimal position in the event processing stream to reintroduce the unconsumed event. The optimal position may be determined based on an operating guideline such as, for example, a guideline to maximize operating efficiency as well as a business guideline such as, for example, a guideline to minimize operating costs. Then, the unconsumed events may be reintroduced into the event processing stream at the determined injection points. Consistent with present disclosures, the events time bucket table may be updated with the event complete status when consumption of the unconsumed events is completed.

Figure 5:
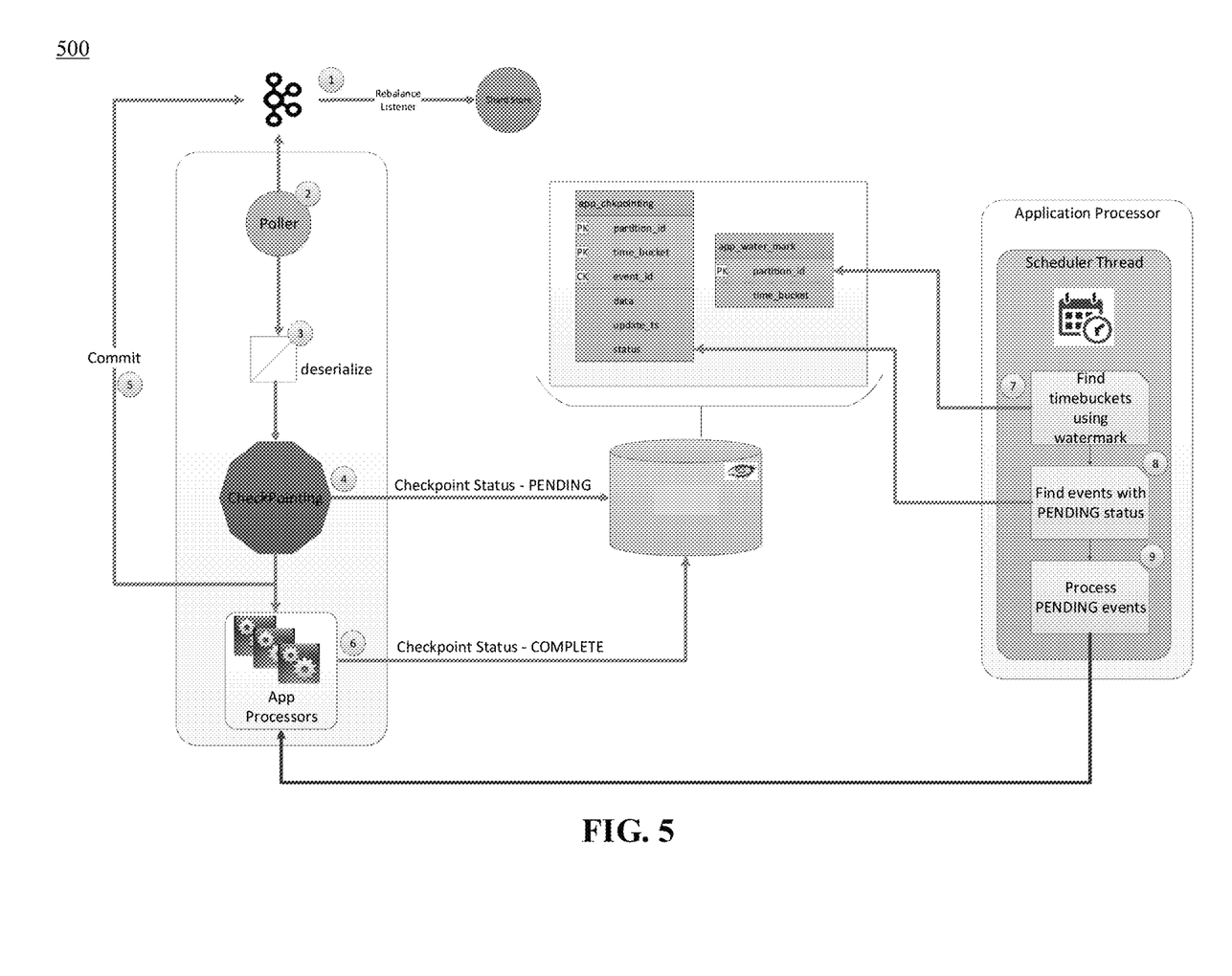
FIG. 5 is an architecture diagram of an exemplary process for implementing a method for providing event consumption checkpointing via a durable storage repository to facilitate accurate and resilient ingestion of events from event topics.

FIG. 5 is an architecture diagram 500 of an exemplary process for implementing a method for providing event consumption checkpointing via a durable storage repository to facilitate accurate and resilient ingestion of events from event topics.

In FIG. 5, while consuming from an event topic, events may be written to a durable store prior to offset commits being returned to the message broker. Over the lifecycle of ingesting each of the events, multiple stages may be written to the durable store and marked as fully consumed at the end of the consumption for each the events. Asynchronously, another process in the application is evaluating the check pointing durable store to identify messages that have not been fully consumed, and reintroducing each of the unconsumed messages to the application flow at a corresponding appropriate stage.

Figure 6:
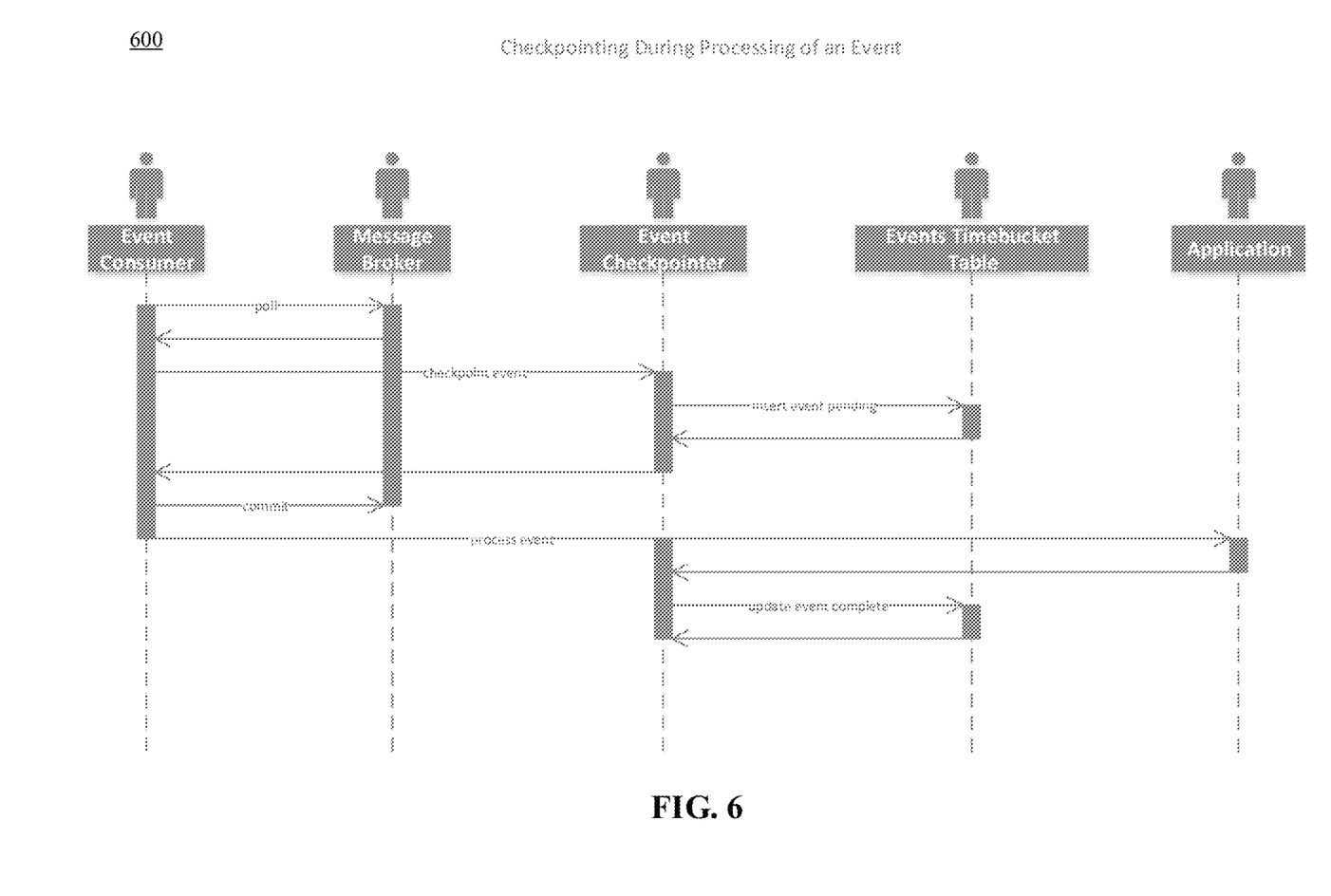
FIG. 6 is a flow diagram of an exemplary checkpointing process for implementing a method for providing event consumption checkpointing via a durable storage repository to facilitate accurate and resilient ingestion of events from event topics.

FIG. 6 is a flow diagram 600 of an exemplary checkpointing process for implementing a method for providing event consumption checkpointing via a durable storage repository to facilitate accurate and resilient ingestion of events from event topics. In FIG. 6, process flow for checkpointing during processing of an event is provided.

As illustrated in FIG. 6, an event consumer may poll a message broker to initiate consumption of an event. Based on a result of the polling, the event consumer may initiate a checkpointing for the event with the event checkpointer. The event checkpointer may insert an event pending status in the events time bucket table. After insertion of the event pending status, the event checkpointer may notify the event consumer. Based on the notification, the event consumer may commit with the message broker and process the event with the application. The application may communicate with the event checkpointer to provide relevant operating parameters. Then, the event checkpointer may update the events time bucket table with an event complete status when consumption of the events is complete.

Figure 7:
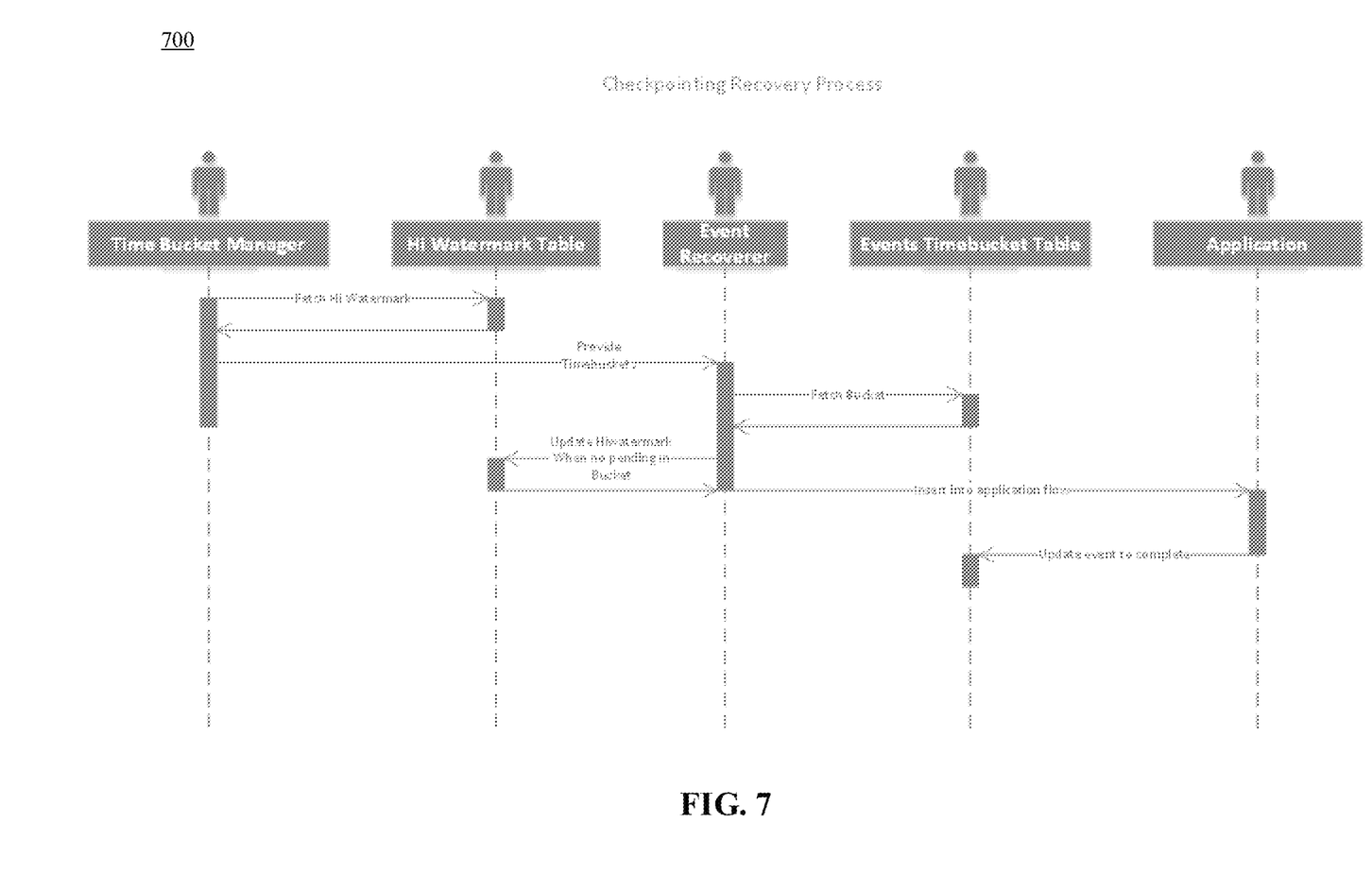
FIG. 7 is a flow diagram of an exemplary checkpointing recovery process for implementing a method for providing event consumption checkpointing via a durable storage repository to facilitate accurate and resilient ingestion of events from event topics.

FIG. 7 is a flow diagram 700 of an exemplary checkpointing recovery process for implementing a method for providing event consumption checkpointing via a durable storage repository to facilitate accurate and resilient ingestion of events from event topics. In FIG. 7, process flow for a checkpointing recovery process is provided.

As illustrated in FIG. 7, a time bucket manager may fetch high watermark information from the high watermark table. Based on the high watermark information, the time bucket manager may provide event time buckets to an event recoverer. The event recoverer may fetch corresponding event time buckets from the events time bucket table. The event recorder may update the high watermark table with appropriate values when no pending events are in the fetched event time buckets. When necessary, the high watermark table may insert relevant information into the application flow of the application. Then, the application may update the events time bucket table with a completed status for the events when consumption of the events is complete.

Accordingly, with this technology, an optimized process for providing event consumption checkpointing via a durable storage repository to facilitate accurate and resilient ingestion of events from event topics is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing ingestion checkpointing from an event topic, the method being implemented by at least one processor, the method comprising:
   polling, by the at least one processor via an event consumer, a message broker to initiate consumption of at least one event from the event topic, the event topic relating to event storage;
   checkpointing, by the at least one processor based on a result of the polling, the consumption of the at least one event by writing corresponding data in multiple stages to a checkpointing durable store;
   inserting, by the at least one processor, an event pending status for the at least one event in an events time bucket table;
   committing, by the at least one processor via the event consumer, the consumption of the at least one event;
   initiating, by the at least one processor, event processing for the at least one event; and
   updating, by the at least one processor, the events time bucket table with an event complete status when consumption of the at least one event is completed.

2. The method of claim 1, further comprising:
   asynchronously evaluating, by the at least one processor during the event processing, the checkpointing durable store to identify at least one unconsumed event that has not been fully consumed; and
   automatically reintroducing, by the at least one processor, the identified at least one unconsumed event into the event processing.

3. The method of claim 2, wherein asynchronously evaluating the checkpointing durable store further comprises:
   identifying, by the at least one processor, the events time bucket table that corresponds to the event processing by using a high watermark table; and
   discovering, by the at least one processor, at least one pending event in the identified events time bucket table, wherein the at least one pending event is associated with the event pending status.

4. The method of claim 2, wherein automatically reintroducing the identified at least one unconsumed event further comprises:
   determining, by the at least one processor, at least one injection point for the at least one unconsumed event; and
   reintroducing, by the at least one processor into the event processing, the at least one unconsumed event at the determined at least one injection point.

5. The method of claim 4, wherein the determined at least one injection point corresponds to at least one stage in the event processing, the at least one stage relating to an optimal position in the event processing to reintroduce the at least one unconsumed event.

6. The method of claim 4, wherein the events time bucket table is updated with the event complete status when consumption of the at least one unconsumed event is completed.

7. The method of claim 1, wherein the event topic relates to an ordered log of a plurality of events that stores and publishes at least one record for a plurality of producers and a plurality of subscribers in a distributed event store and stream-processing environment.

8. The method of claim 1, wherein the corresponding data is written sequentially to the checkpointing durable store in multiple stages, each of the multiple stages relating to a portion of the corresponding data that is segmented based on load balancing.

9. The method of claim 1, further comprising:
   deserializing, by the at least one processor, the at least one event prior to the checkpointing,
   wherein the deserializing relates to conversion of a stream of bytes that correspond to the at least one event into a readable and interpretable data object.

10. A computing device configured to implement an execution of a method for providing ingestion checkpointing from an event topic, the computing device comprising:
    a processor;
    a memory; and
    a communication interface coupled to each of the processor and the memory,
    wherein the processor is configured to:
       poll, via an event consumer, a message broker to initiate consumption of at least one event from the event topic, the event topic relating to event storage;
       checkpoint, based on a result of the polling, the consumption of the at least one event by writing corresponding data in multiple stages to a checkpointing durable store;
       insert an event pending status for the at least one event in an events time bucket table;
       commit, via the event consumer, the consumption of the at least one event;
       initiate event processing for the at least one event; and
       update the events time bucket table with an event complete status when consumption of the at least one event is completed.

11. The computing device of claim 10, wherein the processor is further configured to:
    asynchronously evaluate, during the event processing, the checkpointing durable store to identify at least one unconsumed event that has not been fully consumed; and
    automatically reintroduce the identified at least one unconsumed event into the event processing.

12. The computing device of claim 11, wherein, to asynchronously evaluate the checkpointing durable store, the processor is further configured to:
    identify the events time bucket table that corresponds to the event processing by using a high watermark table; and
    discover at least one pending event in the identified events time bucket table,
    wherein the at least one pending event is associated with the event pending status.

13. The computing device of claim 11, wherein, to automatically reintroduce the identified at least one unconsumed event, the processor is further configured to:

determine at least one injection point for the at least one unconsumed event; and reintroduce, into the event processing, the at least one unconsumed event at the determined at least one injection point.

14. The computing device of claim 13, wherein the determined at least one injection point corresponds to at least one stage in the event processing, the at least one stage relating to an optimal position in the event processing to reintroduce the at least one unconsumed event.

15. The computing device of claim 13, wherein the processor is further configured to update the events time bucket table with the event complete status when consumption of the at least one unconsumed event is completed.

16. The computing device of claim 10, wherein the event topic relates to an ordered log of a plurality of events that stores and publishes at least one record for a plurality of producers and a plurality of subscribers in a distributed event store and stream-processing environment.

17. The computing device of claim 10, wherein the processor is further configured to write the corresponding data sequentially to the checkpointing durable store in multiple stages, each of the multiple stages relating to a portion of the corresponding data that is segmented based on load balancing.

18. The computing device of claim 10, wherein the processor is further configured to:

deserialize the at least one event prior to the checkpointing, wherein the deserializing relates to conversion of a stream of bytes that correspond to the at least one event into a readable and interpretable data object.

19. A non-transitory computer readable storage medium storing instructions for providing ingestion checkpointing from an event topic, the storage medium comprising executable code which, when executed by a processor, causes the processor to:

poll, via an event consumer, a message broker to initiate consumption of at least one event from the event topic, the event topic relating to event storage;

checkpoint, based on a result of the polling, the consumption of the at least one event by writing corresponding data in multiple stages to a checkpointing durable store;

insert an event pending status for the at least one event in an events time bucket table;

commit, via the event consumer, the consumption of the at least one event;

initiate event processing for the at least one event; and update the events time bucket table with an event complete status when consumption of the at least one event is completed.

20. The storage medium of claim 19, wherein, when executed by the processor, the executable code further causes the processor to:

asynchronously evaluate, during the event processing, the checkpointing durable store to identify at least one unconsumed event that has not been fully consumed; and automatically reintroduce the identified at least one unconsumed event into the event processing.

* * * * *